(12) United States Patent
Fitzmaurice et al.

(10) Patent No.: US 6,742,704 B2
(45) Date of Patent: Jun. 1, 2004

(54) MULTIPLE-SERVICE CARD SYSTEM

(75) Inventors: Mary Ann Fitzmaurice, New York, NY (US); Aliza Freud, New York, NY (US); Ray Sharp, Coral Springs, FL (US); Jason Nanton, New York, NY (US); Scott Vosburgh, Greensboro, NC (US)

(73) Assignee: American Express Travel Related Services Company, Inc., New York, NY (US)

( * ) Notice: Subject to any disclaimer, the term of this patent is extended or adjusted under 35 U.S.C. 154(b) by 12 days.

(21) Appl. No.: 09/764,688

(22) Filed: Jan. 16, 2001

(65) Prior Publication Data

US 2001/0048023 A1 Dec. 6, 2001

Related U.S. Application Data (60) Provisional application No. 60/177,530, filed on Jan. 21, 2000.

(51) Int. Cl.[7] .................................................. G06K 5/00
(52) U.S. Cl. ...................... 235/380; 235/375; 235/379; 235/383; 235/492; 705/35; 705/41
(58) Field of Search ................................. 235/380, 375, 235/379, 383, 492; 705/35, 41

(56) References Cited

U.S. PATENT DOCUMENTS

| | | | | |
|---|---|---|---|---|
| 3,376,661 A | * | 4/1968 | Hulett | 283/76 |
| 4,066,873 A | | 1/1978 | Schatz | 235/487 |
| 4,318,554 A | | 3/1982 | Anderson et al. | 287/7 |
| 4,443,027 A | | 4/1984 | McNeely et al. | 235/487 |
| 4,593,936 A | | 6/1986 | Opel | 283/114 |
| 4,663,518 A | | 5/1987 | Borror et al. | 235/487 |
| 4,998,753 A | | 3/1991 | Wichael | 283/84 |
| 5,259,649 A | * | 11/1993 | Shomron | 283/114 |
| 5,276,311 A | * | 1/1994 | Hennige | 235/380 |
| 5,308,121 A | * | 5/1994 | Gunn | 283/99 |

(List continued on next page.)

FOREIGN PATENT DOCUMENTS

| | | | | |
|---|---|---|---|---|
| DE | 29702538 U1 | * | 4/1997 | G06K/19/077 |
| JP | 08244385 A | * | 9/1996 | |
| JP | 08324163 A | * | 12/1996 | |
| WO | 99/27492 | * | 6/1999 | |
| WO | WO 200155955 A1 | * | 8/2001 | G06K/5/00 |

OTHER PUBLICATIONS

Costco, The Choice is Yours, 1998, http://www.costco.com/frameset.asp?trg=subcat%2Easp&catid=502&subid=503&log=.*
For Partners, Card Co–branding, 2000, http://www.statravel.com.sg/idcards/pcobrand.*
USBanker, Article 5, 1995, http://www.banking.com/usbanker/art5.*

Primary Examiner—Michael G. Lee
Assistant Examiner—Ahshik Kim
(74) Attorney, Agent, or Firm—Snell & Wilmer L.L.P.

(57) ABSTRACT

A system and method for providing a multiple-service card is disclosed. As a result, a card member 108 is provided with a single card that serves as both a credit card and a club membership card for access to the service partner's exclusive club. This multiple-service card may have the traditional credit card data on one side of the card, including, for example, the account number, name of the account holder, and the expiration date. The other side of the card may include a magnetic stripe that contains the account information in machine readable form as well as membership information suitable to permit entry into a service partner's facility. In the system, the primary party and the service partner participants cooperate to complete the processes associated with the provision of the combined card services, including a new account process, card replacement and renewal processes, a service partner membership cancellation process, and a process for cancellation and/or transfer by a primary party.

11 Claims, 8 Drawing Sheets

U.S. PATENT DOCUMENTS

| | | | | |
|---|---|---|---|---|
| 5,477,040 A | * | 12/1995 | Lalonde | 235/375 |
| 5,503,434 A | | 4/1996 | Gunn | 283/61 |
| 5,530,232 A | * | 6/1996 | Taylor | 235/380 |
| 5,534,857 A | * | 7/1996 | Laing et al. | 235/380 |
| 5,544,246 A | * | 8/1996 | Mandelbaum et al. | 380/23 |
| 5,569,897 A | * | 10/1996 | Masuda | 235/379 |
| 5,590,038 A | | 12/1996 | Pitroda | 235/380 |
| 5,844,230 A | * | 12/1998 | Lalonde | 235/449 |
| 5,883,377 A | * | 3/1999 | Chapin, Jr. | 235/487 |
| 5,923,734 A | * | 7/1999 | Taskett | 379/114.18 |
| 5,923,884 A | | 7/1999 | Peyret et al. | |
| 5,924,080 A | | 7/1999 | Johnson | 235/86 |
| 5,969,318 A | * | 10/1999 | Mackenthun | 235/380 |
| 5,991,748 A | * | 11/1999 | Taskett | 705/39 |
| 6,016,476 A | * | 1/2000 | Maes et al. | 705/26 |
| 6,032,136 A | * | 2/2000 | Brake, Jr. et al. | 705/41 |
| 6,038,292 A | * | 3/2000 | Thomas | 379/114.18 |
| 6,068,184 A | * | 5/2000 | Barnett | 235/379 |
| 6,085,976 A | * | 7/2000 | Sehr | 235/384 |
| 6,089,611 A | * | 7/2000 | Blank | 156/230 |
| 6,099,043 A | * | 8/2000 | Story | 281/15.1 |
| 6,224,109 B1 | * | 5/2001 | Yang | 283/57 |
| 6,386,444 B1 | * | 5/2002 | Sullivan | 235/375 |
| 6,494,367 B1 | * | 12/2002 | Zacharias | 235/382 |
| 6,505,772 B1 | * | 1/2003 | Mollett et al. | 235/379 |
| 2002/0040936 A1 | * | 4/2002 | Wentker et al. | 235/492 |

* cited by examiner

MULTIPLE-SERVICE CARD SYSTEM

CROSS REFERENCE TO RELATED APPLICATIONS

This application claims benefit from U.S. Provisional Patent Application Ser. No. 60/177,530, filed Jan. 21, 2000, which is hereby incorporated by reference.

FIELD OF THE INVENTION

The present invention generally relates to credit card and membership card services and, more particularly, to a system for providing a single card that functions as both a credit card, for gaining access to credit services provided by a primary party, and a membership card, for gaining access to an exclusive membership club administered by a service partner.

BACKGROUND OF THE INVENTION

In today's world, there is a wide variety of benefits that are available to a consumer where access to the benefits depends upon the consumer's possession of a card. For example, some of the benefits, to which a typical consumer may gain access by possessing a card, include proof of identity, proof of professional licensing, entry to an exclusive membership club, entry to an access-restricted location, access to credit services, telephone system use, and accrual of loyalty rewards/incentives such as frequent flier miles or grocery store discounts and rebates. For example, U.S. Pat. No. 5,924,080, which is hereby incorporated by reference, discloses a system that may enable a consumer to receive discounts without the burden of using coupons, similar to the system currently used by many grocery stores.

Due to the desirability of such benefits, consumers in today's world typically carry a wide array of cards in their wallets and purses. The cards consumers now carry include, among others, credit cards, driver's licenses, club membership cards, frequent flier cards, professional registration cards, retailer loyalty cards, and security-related restricted-access cards. Typically, each of these consumer cards contains information about the specific user or consumer, information about the service or benefit provider and information serving to define the benefits or services, to which the consumer is entitled by virtue of his or her possession of the card. The information concerning the card member may include photographs, signatures, fingerprints, and other information that identifies or describes the card member. Information regarding the identity of the service provider and the associated benefits, to which the card member is entitled, may be readily ascertained by reading the face of the card, may be encoded or accessed by using the card. Information may be incorporated onto the cards through a variety of means including imprinting, punching, laminating, embossing, bar encoding, magnetic stripe encoding, and even affixation or incorporation of microchips. For example, U.S. Pat. No. 4,998,753, which is hereby incorporated by reference, discloses a driver's license formed as a plastic card.

Unfortunately, due to the proliferation of services and benefits currently available from diverse service providers, the quantity of cards that average consumers carry has become unreasonably and unnecessarily burdensome. For example, on a single shopping trip, a typical consumer may carry a drivers license to drive their motor vehicle to the merchant's location, a membership card to obtain access to the merchant's exclusive membership club, a calling card to make phone calls during the shopping trip, and a credit card to obtain credit services to facilitate the purchase of goods from the merchant. Yet, it can be cumbersome and uncomfortable to carry all these necessary cards in one's wallet, pocket or purse.

Thus, it would be advantageous to decrease the volume of cards that a consumer must carry while retaining the consumer's access to the full array of benefits provided by the diversity of service providers. U.S. Pat. No. 5,590,038, which is hereby incorporated by reference, discloses a universal electronic transaction card that may serve as a credit card, identification card, and medical card. Further, U.S. Pat. No. 5,844,230, which is also hereby incorporated by reference, discloses a card that may contain the information of two credit cards on a single card. While these references attempt to decrease the volume of cards a consumer must carry to access a given set of services, they require, among other elements, multiple sets of embossed information and multiple magnetic stripes.

Simultaneous with this desire to reduce the volume of cards, there is an evident need to increase the information carrying capacity of such consumer cards. For example, U.S. Pat. No. 5,308,121 and a related patent, U.S. Pat. No. 5,503,434, both of which are hereby incorporated by reference, disclose credit cards that can be unfolded to allow more room for the printing of information. Furthermore, U.S. Pat. No. 4,066,873, which is also hereby incorporated by reference, discloses a banking identification and access card that contains a magnetic stripe and a bar code on the back of the card that can be scanned by a scanning apparatus.

Yet, despite these varied efforts at increasing the utility of consumer cards while decreasing the volume of cards a consumer must carry, no card currently exists that offers the combined benefits of multiple cards without necessitating the incorporation of additional embossed information or magnetic stripes on the associated card. Furthermore, the prior art attempts at reducing the quantity of cards a consumer must carry are typically aimed at modifying the cards, rather than modifying the processes and systems employed by the individual benefit providers, such that the consumer may continue to enjoy benefit from multiple providers. In fact, none of the methods or systems for providing a multiplicity of services through a single card that are known in the art involve substantial administrative cooperation between distinct service providers.

Furthermore, it has become apparent that consumers who seek access to a particular set of benefits from one service provider are more likely to desire access to a second set of benefits from a distinct class of service providers. For example, it stands to reason that consumers who access a membership shopping club are likely to desire credit services during their trip to the club. Therefore, it would be advantageous for providers of distinct services such as credit services and membership club shopping services to cooperate to offer a single card that provides consumers with access to the benefits of the currently separate and distinct cards. By doing so, a primary party provider of credit services and a partnering membership club can encourage use of their respective services while providing a synergistic administrative benefit to themselves and their consumers.

Moreover, the separate cards currently carried by a typical consumer contain a multiplicity of duplicate information such as pictures, signatures, addresses, billing information, etc. Therefore, it would be advantageous to minimize duplication of identical information on multiple cards. It would further be advantageous for the information to be grouped on the different sides of a single card such that a first side of the card provides a first set of benefits while the other side of the card provides access to a separate and distinct set of benefits. Thus, it would be advantageous to have a multiple-service card that functions to provide a consumer with the benefits typically provided by distinct service providers. It would further be advantageous if the multiple-service card did not require multiple card-like elements connected by a hinge or the use of multiple magnetic stripes. It would further be advantageous to have a system and method to facilitate cooperation between separate and distinct providers of card services.

Further, it would be advantageous to have a multiple-service card that functions as both a credit card as well as a separate entity's membership card. It would also be advantageous for the multiple-service card to feature the customer's picture on the card's back side, rather than on its front side. It would also be advantageous to have the picture that is to be placed on the back of the card captured by the service partner and passed to the card generator. It would also be advantageous to have a card that contains a bar code that may be scanned at the point of sale when customers make purchases so that the scanned data may be forwarded directly to the service partner's systems for reporting and tracking purposes.

SUMMARY OF THE INVENTION

The present invention provides a system and method for providing consumers with the benefits of multiple cards while allowing consumers to carry a single card. To accomplish this advantage, the system and method of the present invention enables a single card to function in multiple modes, for example, as both a credit card and a separate service partner's membership card. By providing a system of back-end functionality that takes advantage of cooperation between the multiple service providers, the present invention eliminates the disadvantages of the prior art systems such as, for example, the requirement to join, through use of a hinge and a fastener, multiple card segments or the requirement to embed multiple magnetic stripes into the consumer's card.

More particularly, the system of the present invention provides methods for opening new accounts, methods for accomplishing card replacement, methods for canceling a service partner membership, methods for canceling a primary party account, and methods for transferring an account to a different service partner account. The multiple-service card enabled by the present invention may include any combination of membership information, a barcode, and a photo in addition to standard credit card information.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF EXEMPLARY EMBODIMENTS

The present invention may be described herein in terms of functional block components, screen shots, optional selections, and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction to cryptography, please review a text written by Bruce Schneider, which text is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system. It should further be noted that the order of the steps denoted in the attached drawings are not intended as limitations and the steps may be accomplished in other orders without deviating from the scope of the present invention. Still further, the actors denoted as performing individual steps in the disclosed process should not be interpreted as limiting in any way as one with ordinary skill in the art appreciates that the steps may be performed by actors different from those disclosed herein without deviating from the spirit and scope of the present invention.

It will be appreciated that many applications of the present invention could be formulated. One skilled in the art will appreciate that the network may include any system for exchanging data or transacting business, such as the Internet, an intranet, an extranet, WAN, LAN, satellite communications, and/or the like. The parties may interact with the system via any input device such as a keyboard, mouse, kiosk, personal digital assistant, handheld computer (e.g., Palm Pilot®), cellular phone, and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention may be implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

The consumer, merchant, primary party, and service partner may represent individual people, entities, or businesses. Although labeled as a "primary party," the primary party may represent other types of card issuing institutions, such as credit card companies, card sponsoring companies, loyalty/incentive companies or third party issuers under contract with financial institutions. It is further noted that other participants may be involved in some phases of the system and methods, but these participants are not shown.

Figure 1:
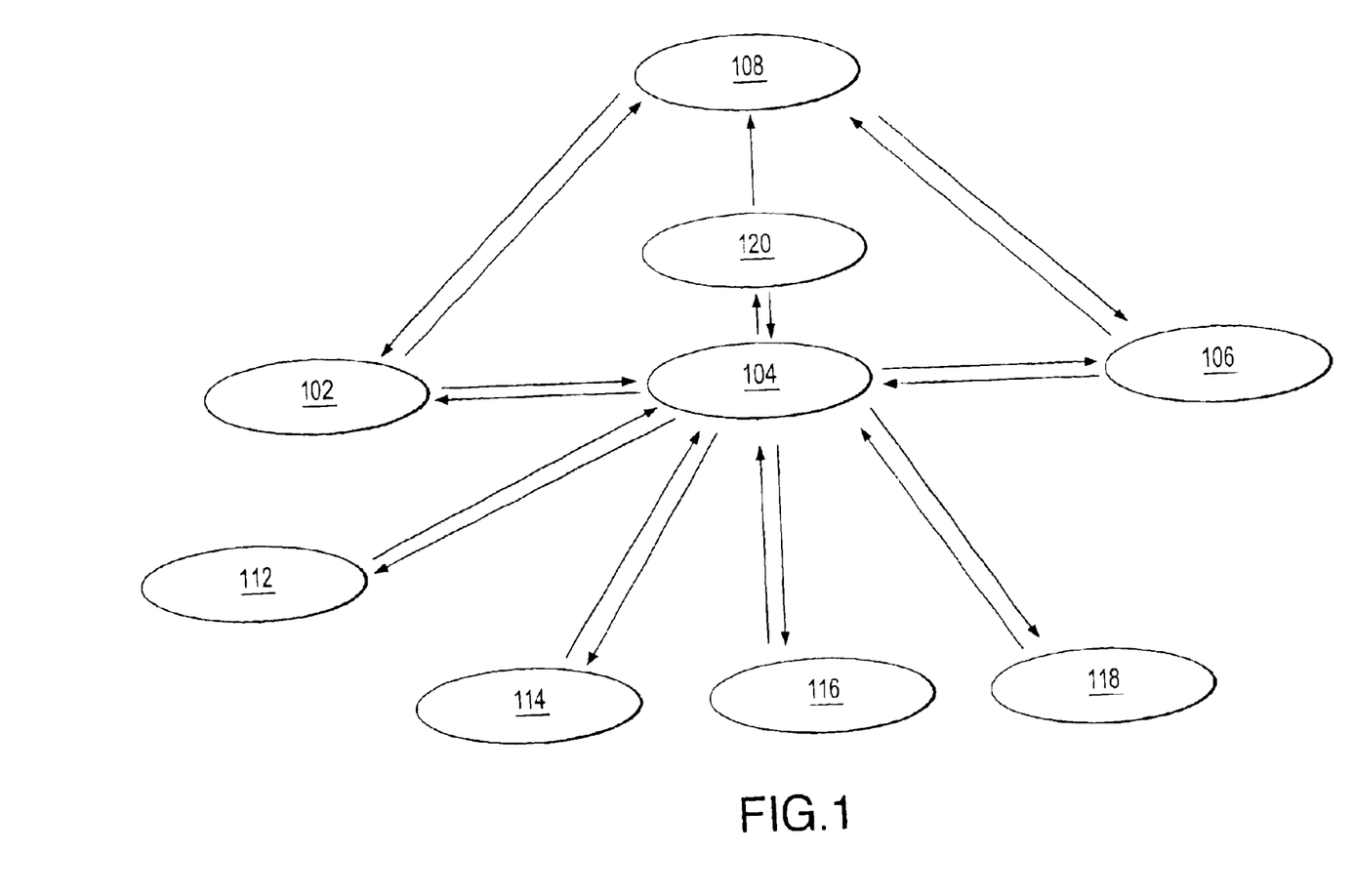
FIG. 1 is a schematic diagram of an exemplary system for providing a multiple-service card.

As illustrated in FIG. 1, in an exemplary embodiment, the system of the instant invention may comprise a primary party 102 provider of credit services as well as a service partner 106. Both the primary party 102 and the service partner 106 are equipped with a computing unit or system to facilitate online commerce transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, network sets of computers, and/or the like.

The primary party 102 and the service partner 106 both comprise computing units or systems, which communicate with and through a card service engine 104, and all of which are connected with each other via a data communication network. The network may be a public network, which should be assumed to be insecure and open to eavesdroppers. For example, the internet may be employed as the network. In this context, the computers may or may not be connected to the Internet at all times. For instance, the service partner 106 computer may employ a modem to occasionally connect to the Internet, whereas the primary party's computing center might maintain a permanent connection to the Internet. It is noted that the network may also be implemented as other types of networks, such as an interactive television (ITV) network. The computers may also be interconnected via existing proprietary networks such as those that presently accommodate transactions for credit cards, debit cards, and other types of financial/banking cards. Such an interconnection is a closed network that may be assumed to be secure from eavesdroppers. Examples of these proprietary networks include the American Express®, VisaNet®, and the Veriphone® networks.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions, which execute on the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means, which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems, which perform the specified functions or steps, or suitable combinations of special purpose hardware and computer instructions.

Further, as one skilled in the art will appreciate, a "consumer card" or "credit card", as used herein, includes any device, code, or suitable financial instrument. The device, code or instrument may also represent an account with a financial institution, such as a bank, a card issuer, and/or the like. The device, code, or other suitable financial instrument may also have a credit line or balance associated with it, wherein the credit line or balance is in a form of a financial tender having discrete units, such as currency. Moreover, a "consumer card" or "credit card", as used herein, includes any device, code, or financial instrument suitably configured to allow the cardholder to interact or communicate with the system, such as, for example, a charge card, credit card, debit card, prepaid card, telephone card, smart card, magnetic stripe card, bar code card, authorization/access code, personal identification number (PIN), Internet code, other identification code, and/or the like. Additionally, a "cardholder" or "card member" includes any person or entity that uses a consumer card and participates in the present system and may include a person who is simply in possession of a financial account identifier, such as an authorization or account code.

Communication between the parties to the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

In general, in an exemplary embodiment, the multiple-service card is a credit card co-branded with a service partner membership card. A prospective card member 108 provides the service partner 106 with application information for both the primary party's services and a service partner's services. Such information may include, for example, traditional credit card application information as well as traditional membership club application information. The service partner 106 collects and processes the application information, and forwards it to the primary party 102, via the card service engine 104, for further processing. The card service engine 104 approves or declines the new account, and returns the information to the service partner 106. The service partner 106, then, matches the approved accounts with the membership applications it has previously processed. Finally, the service partner 106 sends its membership information to a card generator 120, which fabricates the physical card and sends the card to the card member 108. An example of the card fabrication process is found in U.S. patent application Ser. No. 09/653,837 entitled "Transaction Card" filed Sep. 1, 2000, the entire contents of which are herein incorporated by reference.

As a result, a card member 108 may be provided with a single card that serves as both a credit card and a club membership card for access to the service partner's open or exclusive club. This multiple-service card may have the traditional credit card data on one side of the card, including, for example, the account number, name of the account holder, and the expiration date. The other side of the card may include a magnetic stripe that contains the account information in machine readable form, a space for a signature, a customer service number, a service partner membership number that is suitable to permit entry into a service partner's facility, a barcode with the same membership information and that may be scanned at the point of sale, and a photograph or a digital image or another identifying image of the card holder. The photograph or other identifying image may be taken at the service partner's location. Any combinations of the foregoing data may be located on either side of the card.

In the system of the instant invention, the primary party 102 and the service partner 106 participants cooperate to complete the processes associated with the provision of the combined card services. Those processes may include a new account process card replacement and renewal processes, a service partner membership cancellation process, and a process for cancellation and/or transfer by a primary party 102. The card replacement and renewal process may be initiated by the primary party 102 or the service partner 106 and may be a response to a member's request, a member's reporting of fraudulent activity, an emergency, or the member's activity in association with a service partner 106. Each of the process participants performs a series of process steps.

As used herein, the term product control number refers to a number that identifies the service partner 106 that keyed in the application and the date on which it was keyed. Also, as used herein, the term balancing report refers to a report that verifies and files information sent between two parties. Finally, the information administrator 112 records information, transfers files, and send reports and other electronic communication between the primary party 102 and a service partner 106.

The New Account Process

Figure 2A:
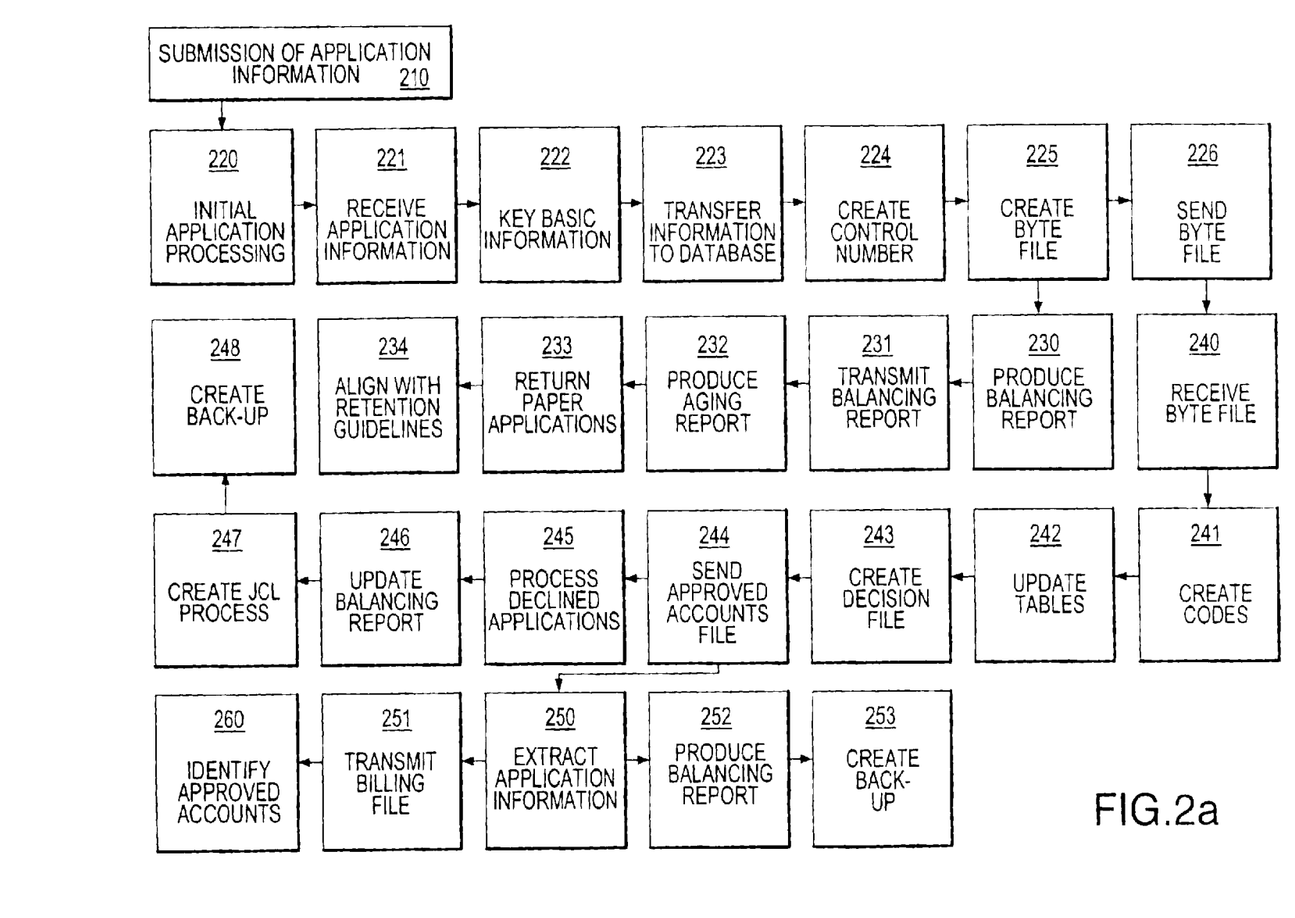
FIG. 2a is a flowchart of a portion of an exemplary new account process, complementing FIG. 2b, in accordance with the present invention.
Figure 2B:
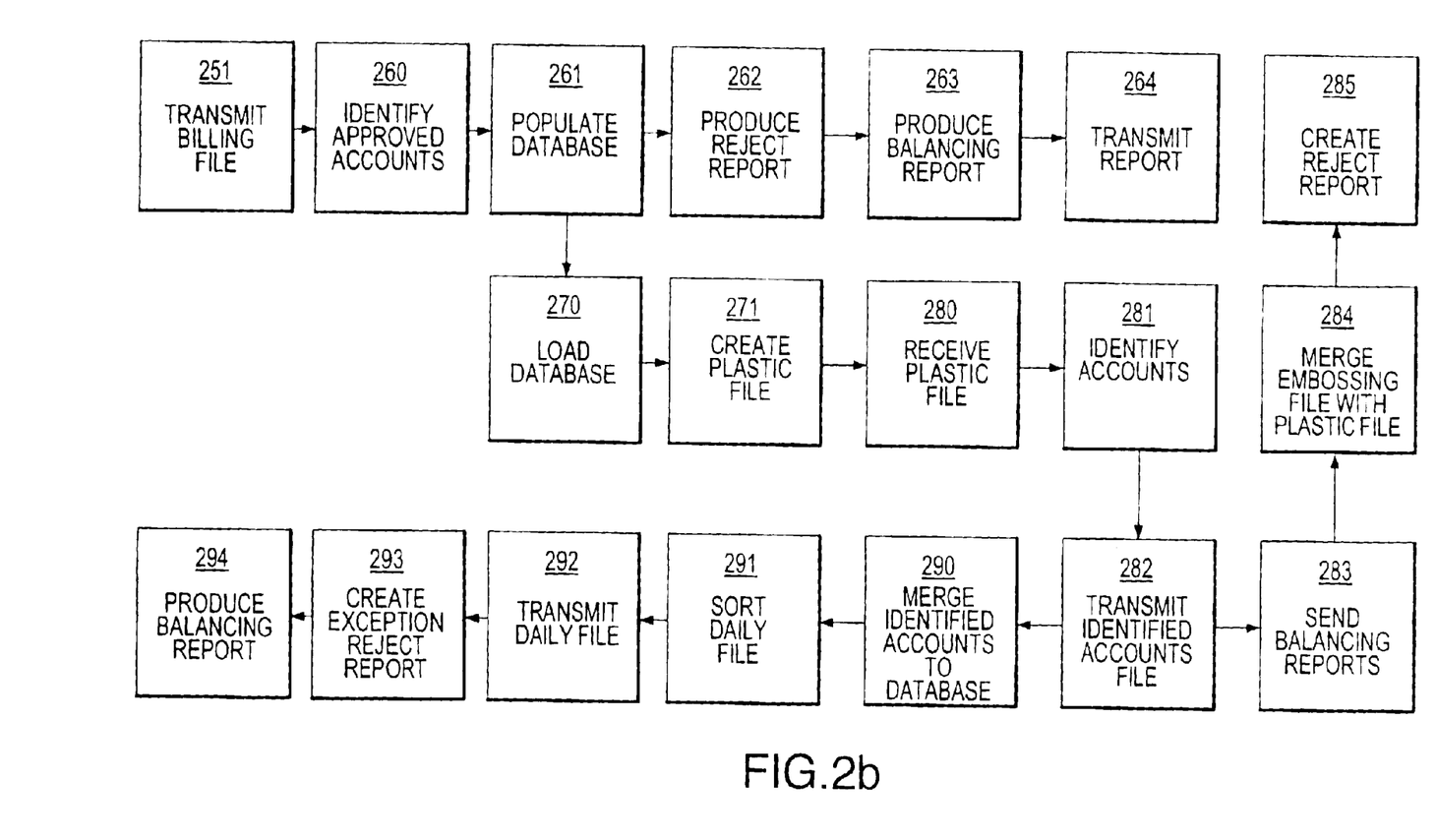
FIG. 2b is a flowchart of a portion of an exemplary new account process, complementing FIG. 2a, in accordance with the present invention.

In an exemplary new account process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Referring to FIGS. 2a and 2b, regardless whether, or to which entities, the various process steps are delegated, the new account process is initiated by a card member's submission of application information (step 210) to either the service partner 106 or the primary party 102. If the card member 108 submits the information to the service partner 106, the service partner 106 performs the initial processing of the application information (step 220). If the card member 108 submits the application information to the card service engine 104, however, the primary party 102 receives the application (step 210) from the card member 108 and routs (step 210) the information to the service partner 106, which performs the initial processing (step 220).

The initial processing (step 220) performed by the service partner 106 includes the steps of receiving (step 221) the application information, keying (step 222) each application information file for basic information, transferring (step 223) the application information into the service partner's database, creating (step 224) a unique application information file product control number for each application, creating (step 225) a standard variable byte file of new application data, and sending (step 226) the standard variable byte file of new application data via batch process interface/T1 line to the card service engine 104. The unique product control number is also applied to any physical application, which is also sent to retention. In an exemplary embodiment, this file does not contain any service partner 106 member data.

In addition to accomplishing the initial processing of new application information, the service partner 106 produces (step 230) a balancing report containing the total records of each file and transmits (step 231) the report to the primary party 102. The service partner 106 also produces (step 232) a new account aging report of any applications greater than a predetermined period of time, for example, 30 days. These reports are utilized by the information administrator 112 after each transmission. Finally, the service partner 106 returns (step 233) any paper applications and aligns (step 234) with the card service engine's retention guidelines.

Once the initial processing is complete, the card service engine 104 receives (step 240) the standard variable byte file from the service partner 106 and performs additional processing. This additional processing includes creating (step 241) necessary codes and updating (step 242) related tables required to identify the new consumer and the service partner 106 products, creating (step 243) a consolidated decisioning file, sending (step 244) an approved accounts file to the card service engine 104, processing (step 245) declined applications, updating (step 246) the balancing report containing total records of the transmitted file, creating (step 247) a job control language process to execute the information administrator balancing job, and creating (step 248) a back-up of the transmitted file and balancing reports in accordance with the card service engine's current standards. The consolidated decisioning file contains approved, declined, and cancelled service partner application information.

The customer service administrator 114 extracts (step 250) all approved, declined, and cancelled service partner application information from the card service engine's consolidated decisioning file and transmits (step 251) a billing data file that is sorted, first by product control number and then by sequence number, to the service partner 106 containing data on approved, declined, and cancelled service partner accounts, excluding pending applications. The customer service administrator 114 also produces (step 252) a balancing report containing total records of the transmitted file and creates a job control language process to execute the information administrator balancing job after receiving the service partner's transmission report. Finally, the customer service administrator 114 creates (step 253) a back-up of the transmitted file and balancing report with an expiration of 90 days.

With all declined or cancelled applications, the billing data file contains the transaction date, the product control number, the card member's name, the sequence number, and the status code indicating whether the status is approved, declined, or cancelled. With all approved applications, the billing data file contains the transaction date, the primary party's account number (basic and supplemental), the product control number, the card member's name, the sequence number, and the status code indicating whether the status is approved, declined, or cancelled.

Once the service partner 106 receives the billing data file that was transmitted by the customer service administrator 114, the service partner 106 identifies (step 260) approved accounts by the presence of an account number issued by the primary party 102 and populates (step 261) the service partner's database with the primary party's new account numbers. For any unrecognized product control numbers, the service partner 106 produces (step 262) a reject report to be used for operations reconciliation processes. This reject report includes the primary party's account number, if applicable, the card member's name, the product control numbers, and the transaction date. The service partner 106 also produces (step 263) a balancing report containing total records of the received file and transmits (step 264) the report to the primary party 102. After receiving an approved account file from the card service engine 104, the card service engine 104 loads (step 270) the file onto its database, creates (step 271) a daily plastic file, and, periodically, sends (step 272) a plastic embossing file to the card generator 120.

The card generator 120, receives (step 280), periodically, the plastic file from the card service engine 104. Upon receipt of the plastic file, the card generator 120 identifies (step 281) all service partner charge and lending accounts on the primary party's renewal plastic file and transmits (step 282) an identified accounts file of all identified accounts to the service partner 106. The identified accounts file includes information such as the primary party's account numbers, card member 108 names, the card generator processing identifiers, transaction dates, and the primary party's bag Ids. A new identified accounts file is created periodically for renewal and periodic processing. Balancing reports are also sent (step 283) to show the total number of accounts sent to the service partner 106.

Upon receipt of the identified accounts file from the card generator 120, the service partner 106 merges (step 290) the identified accounts file to the service partner 106 database by the primary party's new account numbers. The service partner 106 periodically sorts (step 291) the daily file by approved, declined, and cancelled in numeric sequential order to create a daily membership file with service partner 106 membership information. Finally, the service partner 106 transmits (step 292) the daily membership file to the card generator 120.

For individual members, service partner 106 membership data includes, for example, the service partner membership number, service partner member since date, service partner member type, and a photo image. For business members, the data includes the company name, their resale ID, the resale type, and the resale state. In general, other membership data includes, for example, a photo image flag indicator, the primary party's new account number, the card generator processing indicator, processing data, and the card generator bag-ID.

After transmitting the daily membership file to the card generator 120, the service partner 106 creates (step 293) an exception reject report containing invalid product control numbers, which are account numbers that did not result in a match on the service partner database. The exception reject report is used with the operations reconciliation process and includes the primary party's account number, card member name, transaction date, the card generator processing indicator, and the primary party 102 bag-ID. Finally, the service partner 106 produces (step 294) a balancing report containing the total records of the received identified accounts file. This balancing report is utilized by the information administrator 112 after each transmission for balancing with the card generator 120.

After receiving the updated embossing information file from the service partner 106, the card generator 120 merges (step 284), using the primary party's new account number, the data from the updated embossing information file with the plastic file that was received previously from the card service engine 104. In addition, the card generator 120 embosses all required primary party 102 data, prints a card member number on the signature panel, prints applicable service partner membership data such as that which is described above, on the back of the primary party card, places the service partner membership number in the third magnetic stripe position, converts the service partner membership number to a bar code, prints the bar code on the back of the membership card, and sends the membership card to the card member 108.

In addition, the card generator 120 creates (step 285) a reject report for all non-primary party account numbers or invalid card generator processing indicators received from the service partner 106. This reject report includes all data received on the service partner file except a photo image. The report is labeled "Invalid Accounts Received from Service Partner" and is used for operational reconciliation.

Finally, the card generator 120 re-sends, in a subsequent transmission to the service partner 106, namely account numbers that do not have a service partner membership number. After a predetermined number of attempts, the information is removed from the embossing file and placed on the card generator's reject report. Balancing reports show the total number of accounts received from the service partner 106.

Card Replacement Processes

Figure 3A:
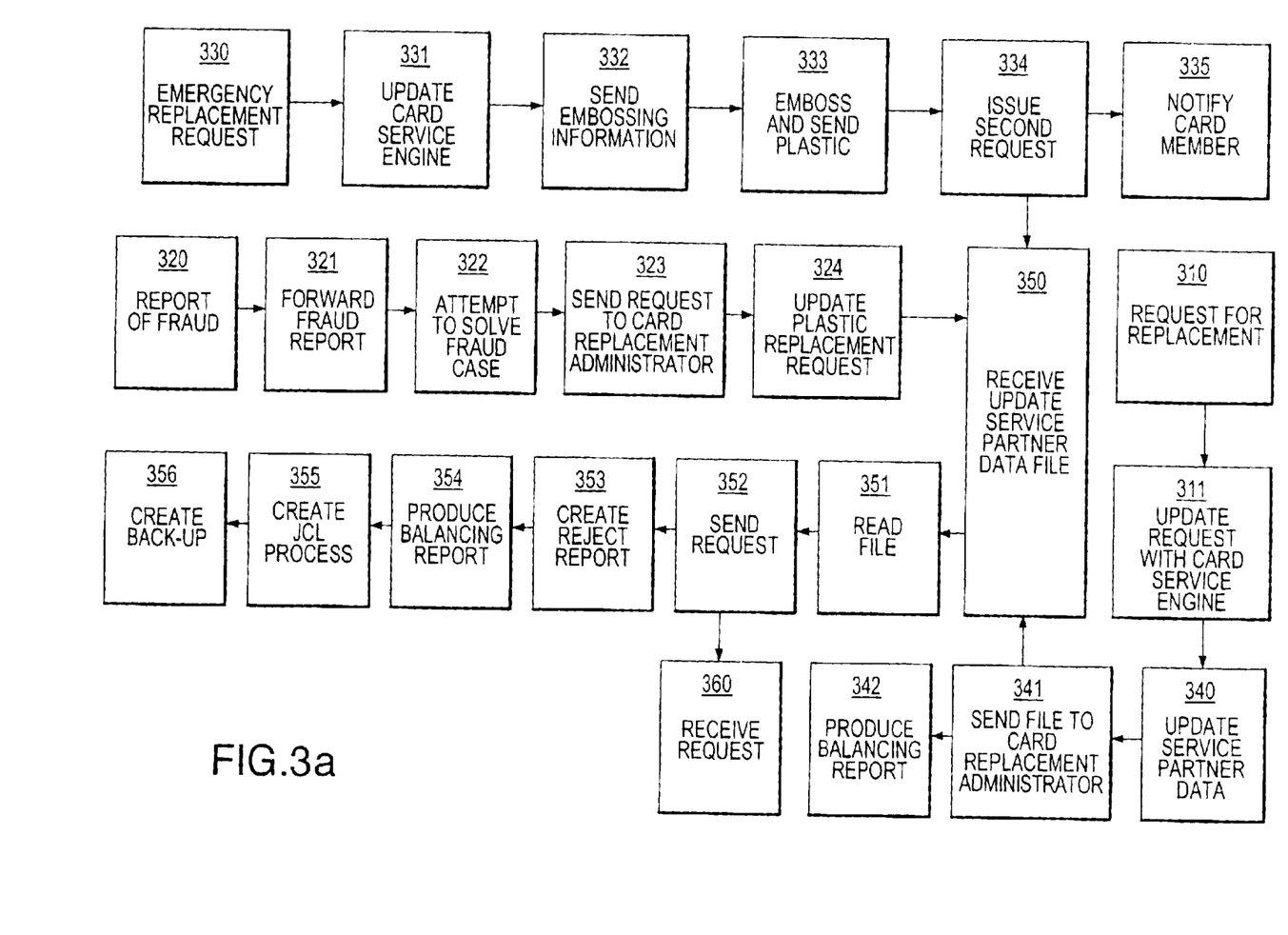
FIG. 3a is a flowchart of a portion of an exemplary multiple-service card replacement process, complementing FIG. 3b, in accordance with the present invention.
Figure 3B:
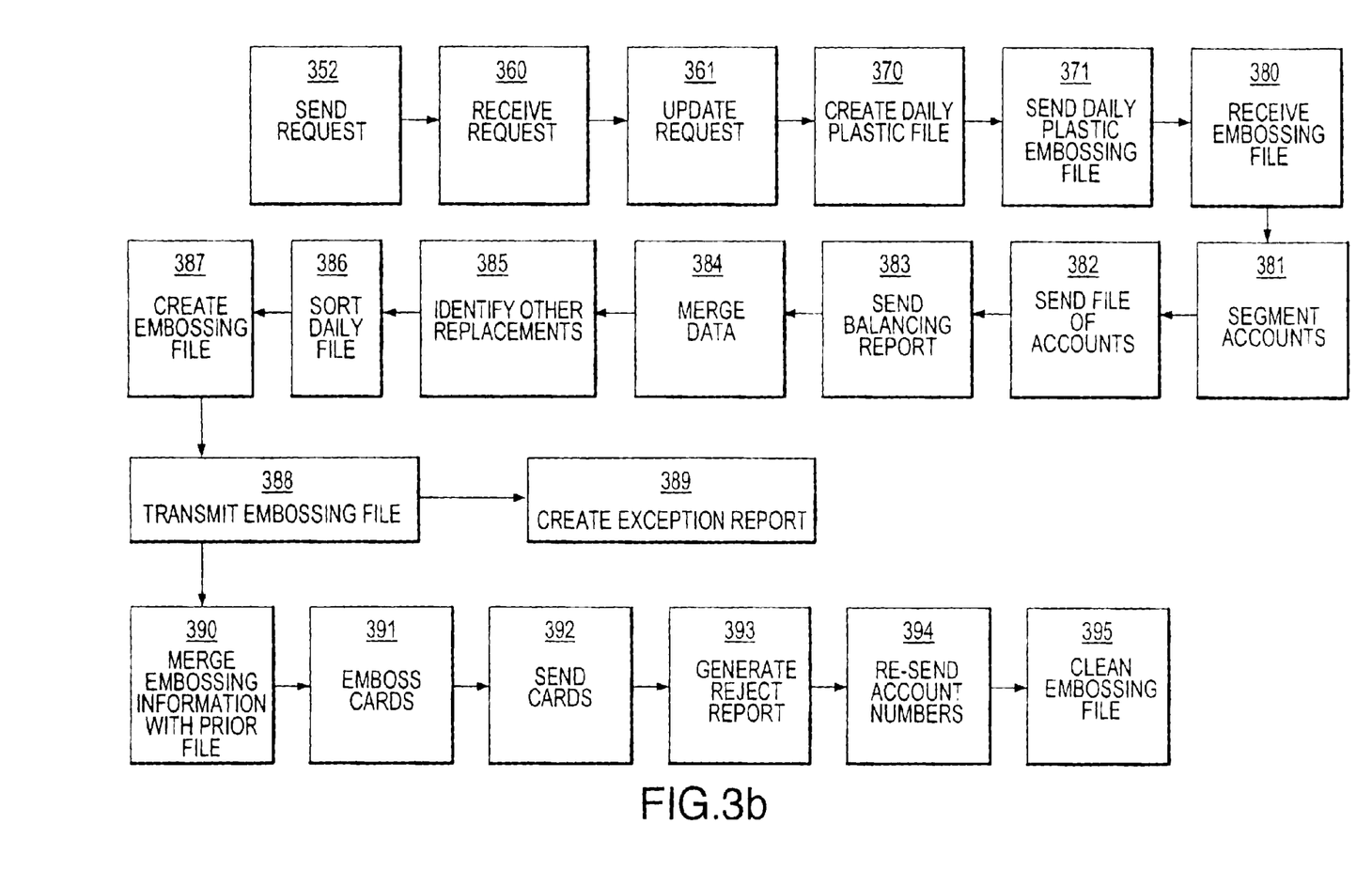
FIG. 3b is a flowchart of a portion of an exemplary multiple-service card replacement process, complementing FIG. 3a, in accordance with the present invention.

In an exemplary card replacement process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Regardless to which entities the various process steps are delegated, the card replacement process may be initiated by the primary party 102, in conjunction with the card member 108, or by the service partner 106. Further, special procedures may be called out in cases of fraud or emergency. In an exemplary embodiment, after initial processing, a plastic card replacement process is initiated.

Referring to FIGS. 3a and 3b, if a card member 108 requests (step 310) card replacement, the card replacement administrator 116 updates (step 311) the plastic replacement request with the card service engine 104 and thereby initiates the plastic card replacement process. If a card member 108 reports (step 320) fraudulent activity on an account, the report is sent (step 321) to the fraud resolution administrator 118, which attempts (step 322) to solve the case and, if the claim is deemed valid, sends (step 323) a request to the card replacement administrator 116, which updates (step 324) the plastic replacement request with the card service engine 104 and thereby initiates the plastic card replacement process.

If a card member 108 requests (step 330) emergency card replacement, the card replacement administrator 116 updates (step 331) the card service engine 104 to not issue a plastic card and updates the card server, which sends (step 332) embossing information to the card generator 120, which embosses (step 333) the plastic and sends it to the card member 108. In an exemplary embodiment, these emergency cards do not contain any service partner data and expire at the end of the following month unless otherwise requested by the card member 108. In addition, the card replacement administrator 116 issues (step 334) a second request to the card service engine 104 to issue service partner replacement plastic, thereby initiating the standard card replacement process. In cases of emergency card replacement, the card member 108 is notified (step 335), first, that emergency card replacement plastic will preferably not contain service partner membership data and that the card member 108 should seek assistance from the service partner membership desk, second, that multiple-service card re-issuance will occur and will be received within a predetermined period of time, and third, that additional cards on the account may be required to be replaced if the service partner 106 determines that there are changes to membership information.

The service partner 106 may initiate card replacement by updating (step 340) the service partner data and sending (step 341) a file to the card replacement administrator 116 indicating the card members 108 who require new plastic cards. The service partner 106 also produces (step 342) a balancing report containing the total records of the transmitted file and transmits the report to the primary party 102. This report is used by the information administrator 112 after each transmission for balancing with the card generator 120.

After receiving (step 350) the updated service partner data file from the service partner 106, the customer service administrator 114 reads (step 351) the file and sends (step 352) a request to the card replacement administrator 116 to create replacement plastic cards. The customer service administrator 114 also creates (step 353) a reject report with the card replacement administrator 116 indicating service partner replacements that have invalid account numbers. Next, the customer service administrator 114 produces (step 354) a balancing report containing the total records of the transmitted/received file. The customer service administrator 114 also creates (step 355) a job control language process to execute the information administrator's balancing job. Finally, the customer service administrator 114 creates (step 356) a back-up of the service partner replacement request file and balancing reports for a predetermined period of time, for example, 90 days.

Upon receipt (step 360) of the request from the customer service administrator 114 to create replacement plastic cards, the card replacement administrator 116 updates (step 361) the plastic replacement request with the card service engine 104 and thereby initiates the plastic card replacement process.

As previously stated, the plastic card replacement process is initiated by a party's updating the plastic replacement request with the card service engine 104. Upon receipt of such an update, the card service engine 104 creates (step 370) a daily plastic file and sends (step 371) a daily plastic embossing file to the card generator 120.

Upon receipt (step 380) of the daily plastic embossing file from the card service engine 104, the card generator 120 segments (step 381) service partner accounts and sends (step 382) a file of all identified service partner accounts to the service partner 106. This file is transmitted daily and contains the primary party's account number, the card member's name, the card generator processing identifier, transaction date, and the primary party's bag ID. Separate files are created for renewal and daily processing. Balancing reports are also sent (step 383) showing total number of accounts sent to the service partner 106.

Upon receipt (step 382) of the file showing all identified service partner accounts, the service partner 106 merges (step 384) the data contained in the file to the service partner database according to the primary party's new account number. At this point, the service partner 106 may also need to determine (step 385) whether additional card members 108 in the relationship require their cards to be replaced due to any changes in service partner membership data. Next, the service partner 106 sorts (step 386) the daily file by the basic cards first, then the supplemental cards, in numeric sequential order. In addition, the service partner 106 creates (step 387) an embossing information file with any new service partner membership data and transmits (step 388) the embossing information file to the card generator 120. The service partner 106 also creates (step 389) an exception reject report for account numbers that did not result in a match on the service partner database. This report is for use with the operations reconciliation process and includes the primary party's account number, card member's name, transaction date, the card generator processing indicator, and the primary party bag-ID. Finally, the service partner produces a balancing report containing total records of the received file.

Upon receipt of the embossing information file from the service partner 106, the card generator 120 merges (step 390) the data from the service partner's embossing information file with the daily plastic embossing file previously received from the card service engine 104. For new account numbers that do not have a service partner membership number, plastic cards will not be embossed. Next, the card generator 120 embosses (step 391) the plastic cards and sends (step 392) the replacement cards to the card members 108. The card generator 120 also generates (step 393) a reject report for all non-primary party account numbers or invalid card generator processing indicators received from the service partner 106. This report includes all data received on the service partner file except the photo image. The report is labeled "invalid accounts received from service partner," and the report is used for operational reconciliation. Finally, the card generator 120 re-sends (step 394) to the service partner account numbers that did not have a service partner membership number. These account numbers are sent in a subsequent transmission. After a predetermined number of attempts, the information is removed (step 395) from the embossing file and placed on the PDR reject report.

Card Maintenance Processes/Service Partner Membership Cancellation.

Figure 4:
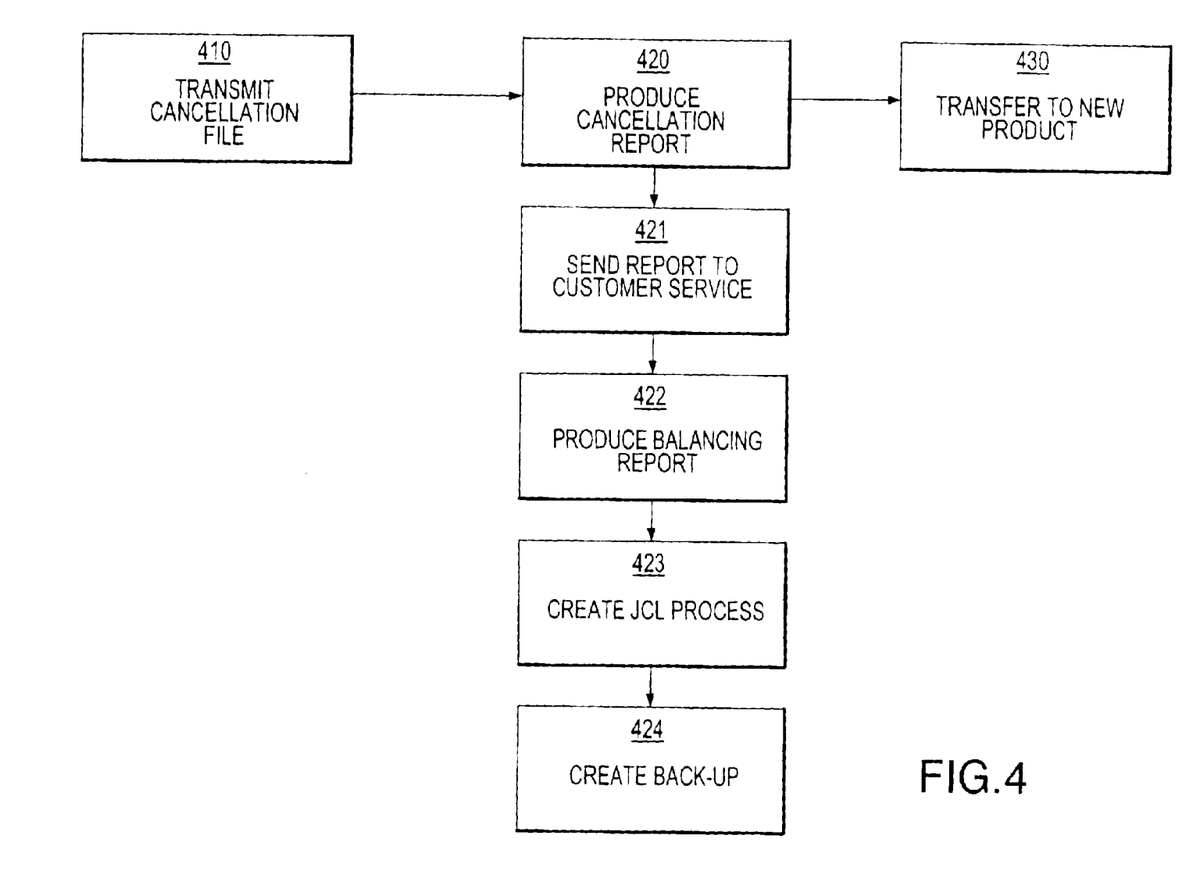
FIG. 4 is a flowchart of an exemplary multiple-service card service partner membership cancellation process in accordance with the present invention.

In an exemplary service partner membership cancellation process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Referring to FIG. 4, regardless to which entities the various process steps are delegated, the service partner membership cancellation process is initiated by the service partner 106, which transmits (step 410) a cancellation file to the primary party 102. The cancellation file contains data elements for all the primary party 102 card members 108 who have cancelled their service partner memberships. These data elements include the cancellation date, the primary party's new account number, and the card member's name.

Upon receipt of the cancellation file from the service partner 106, the primary party 102 produces (step 420) a service partner membership cancellation report on the report generator. This report is used by card service providers to transfer (step 430) card members 108 to a new product. The primary party 102 also sends (step 421) a report to the customer service administrator 114 and produces (step 422) a balancing report containing total records of the received cancellation file. In addition, the primary party 102 creates (step 423) a job control language process to execute the information administrator balancing job. Finally, the primary party 102 creates (step 424) a backup of the service partner's cancellation file and balancing reports for 90 days.

Card Maintenance Processes/Primary Party Card Member Cancellations or Transfers to non-Service Partner Products.

Figure 5A:
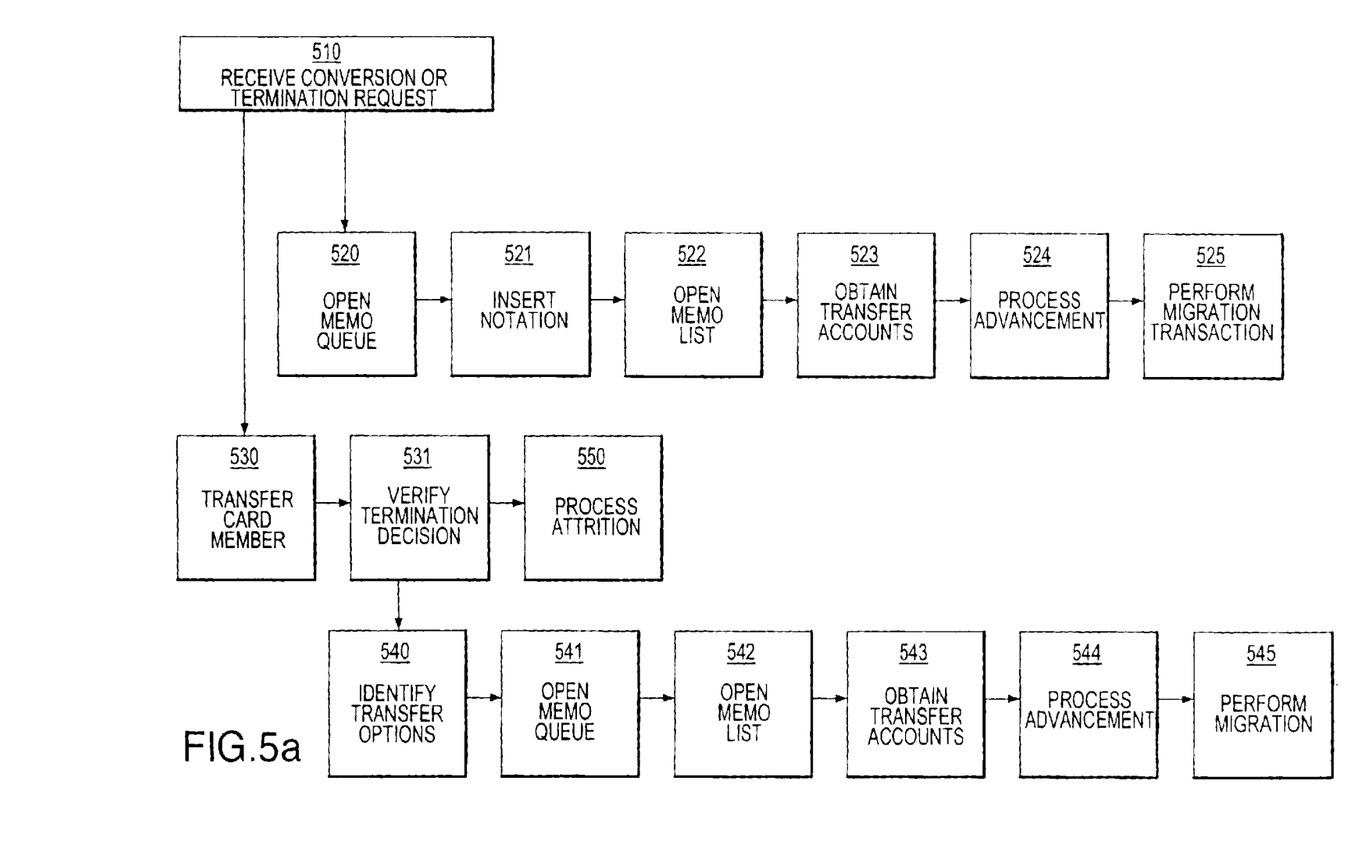
FIG. 5a is a flowchart of a portion of an exemplary multiple-service card primary party cancellation process, complementing FIG. 5b, in accordance with the present invention.
Figure 5B:
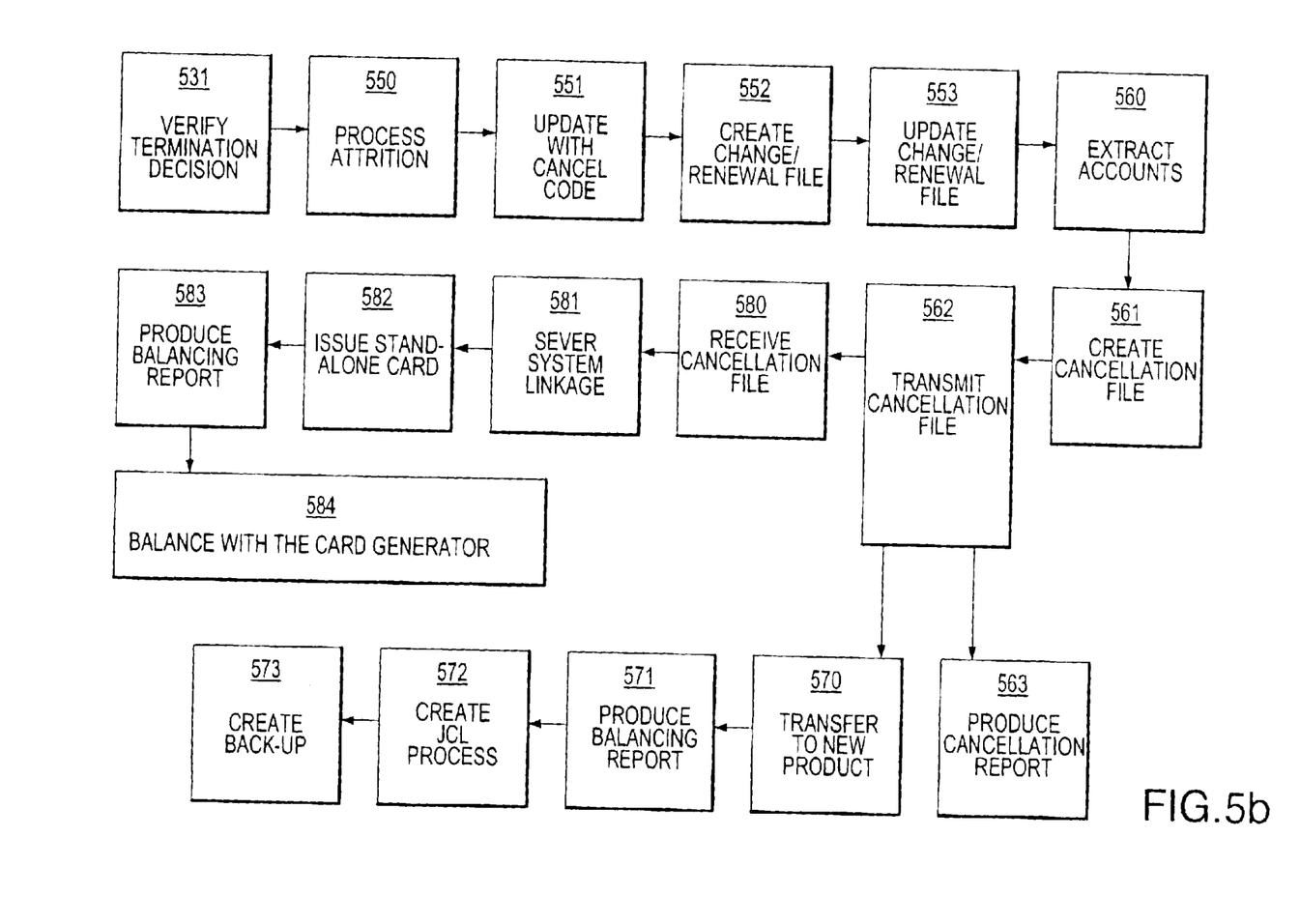
FIG. 5b is a flowchart of a portion of an exemplary multiple-service card primary party cancellation process, complementing FIG. 5a, in accordance with the present invention.

In an exemplary card member cancellation process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Referring to FIGS. 5a and 5b, regardless to which entities the various process steps are delegated, the card member cancellation process is initiated by the primary party's customer service administrator's 114 receiving (step 510) a request from a card member 108 to terminate or convert to another product.

If the card member 108 requests not to terminate, and the card member 108 specifies a product, to which the card member 108 wants to transfer, the customer service administrator 114 opens (step 520) a memo queue and inserts (step 521) a notation indicating that the card member 108 wants to transfer to a specific product. In addition, the customer service administrator 114 opens (step 522) a memo list and obtains (step 523) accounts that must be transferred to a new IA. Finally, the customer service administrator 114 processes (step 524) the advancement of the rebate and performs the migration transaction to move the card member 108 to the new product.

If the card member 108 wants to terminate, or if the card member 108 fails to specify a product, to which the card member 108 wants to transfer, the customer service administrator 114 dial transfers (step 530) the card member 108 to the membership administrator, which verifies (step 531) that the card member 108 wants to terminate.

If the card member's desire to terminate cannot be verified, the membership administrator identifies (step 540) card member transfer options and opens (step 541) a memo queue specifying the product, to which the card member 108 wants to transfer. In addition, the customer service administrator 114 opens (step 542) a memo list and obtains (step 543) accounts that must be transferred to a new IA. Finally, the customer service administrator 114 processes (step 544) the advancement of the rebate and performs (step 545) the migration transaction to move the card member 108 to the new IA.

If the card member's 108 desire to terminate is verified, the membership administrator processes (step 550) the attrition, causing the card service engine 104 to update (step 551) the file with a cancel code. In addition, the card service engine 104 creates (step 552) and/or updates (step 553) the change/renewal file with the transfer code for extraction by the customer service administrator 114.

Once the customer service administrator 114 has extracted (step 560) service partner/primary party accounts from the change/renewal file, the customer service administrator 114 creates (step 561) a cancellation file of all card members 108 who have cancelled their multiple-service card. Next, the customer service administrator 114 transmits (step 562) the cancellation file to the service partner 106 and produces (step 563) a primary party/service partner co-brand card cancellation report on the report generator. This report will be utilized by card provider services to transfer (step 570) card members 108 to a new primary party product. The customer service administrator 114 also produces (step 571) a balancing report containing total records of the transmitted file and creates (step 572) a job control language process to execute the information administrator balancing job. Finally, the primary party 102 creates (step 573) a backup of the service partner cancellation file and balancing reports for 90 days.

Upon receipt (step 580) of the primary party's cancellation file from the customer service administrator 114, the service partner 106 turns the credit flag indicator to N, thereby severing (step 581) the system linkage. In this situation, the service partner 106 may issue (step 582) a stand alone membership card. Finally, the service partner 106 produces (step 583) a balancing report containing the total records of the transmitted file. This balancing report will be utilized (step 584) by the information administrator 112 after each transmission for balancing with the card generator 120.

As one skilled in the art will appreciate, the above described transaction entry interface, as well as any or all other aspects of the present invention, may include any suitable form of encryption and/or other security measures either currently known or hereafter devised.

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the steps recited in any method claims may be executed in any order and are not limited to the order presented in the claims. Moreover, no element is essential to the practice of the invention unless specifically described herein as "critical" or "essential".

What is claimed is:

1. A method for providing a multiple-service card, the method comprising the steps of:

receiving at a service partner an application for a multiple-service card from a consumer, said application comprising fields which include credit card application information for a particular credit card and service partner information, said service partner information related at least in part to membership in the service partner establishment;

reviewing said application for fields which include service partner information;

extracting said service partner information from said application for a multiple-service card;

communicating said service partner information to a service partner to determine if said service partner desires to provide access into said service partner establishment and to purchase goods and services from said service partner using said particular credit card;

reviewing said application for fields which include credit card application information;

extracting said credit card application information from said application for a multiple-service card;

communicating said credit card application information to a provider of credit services, said provider of credit services thereafter determining whether it desires to extend credit to the consumer; and if said provider of credit services desires to extend credit to the consumer, establishing an account associated with said consumer, initiating processing, statementing, billing, accounting, and servicing functions relating to said account and causing a multiple-service card to be sent to the consumer, wherein said multiple-service card is configured for providing a primary party's services and a service partner's services.

2. The method of claim 1 further comprising replacing a multiple-service card, wherein said replacing comprises:
   a. requesting a card replacement administrator to create a replacement card;
   b. in response to said request, said card replacement administrator communicating with a card service engine;
   c. said card service engine communicating account information to a card generator;
   d. said card generator communicating account information to the service partner; and
   e. said service partner communicating account information to the card replacement administrator.

3. The method of claim 1 further comprising canceling a service partner membership, wherein said canceling comprises:
   a. transmitting a file comprising indicia of an account to be canceled,
   b. producing a cancellation report, and
   c. producing a balancing report.

4. The method of claim 1 further comprising canceling a primary party account, wherein said canceling comprises:
   a. transmitting a file comprising indicia of an account to be canceled,
   b. producing a cancellation report, and
   c. producing a balancing report.

5. The method of claim 1 further comprising transferring an account to a second service partner, wherein said transferring comprises:
   a. transmitting a file comprising indicia of a service partner account,
   b. producing a transferring account report, and
   c. producing a balancing report.

6. The method of claim 1, further comprising calculating and issuing a rebate on said credit card, wherein said rebate is based upon purchasing products and services at said service partner.

7. The method of claim 1, further comprising assigning a product control number to said application.

8. A multiple-service card associated with a service partner, a primary party and a holder, the card comprising:
   a first side and a second side,
   the first side having first indicia associated with said primary party,
   the second side having second indicia associated with said service partner,
   wherein said multiple service card is obtained by:
      receiving at a service partner an application for a multiple-service card from a consumer, said application comprising fields which include credit card application information for a particular credit card and service partner information, said service partner information related at least in part to membership in the service partner establishment;
      reviewing said application for fields which include service partner information;
      extracting said service partner information from said application for a multiple-service card
      communicating said service partner information to a service partner to determine if said service partner desires to provide access into said service partner establishment and to purchase goods and services from said service partner using said particular credit card;

reviewing said application for fields which include credit card application information;

extracting said credit card application information from said application for a multiple communicating said credit card application information to a provider of credit services, said provider of credit services thereafter determining whether it desires to extend credit to the consumer; and if said provider of credit services desires to extend credit to the consumer, establishing an account associated with said consumer, initiating processing, statementing, billing, accounting, and servicing functions relating to said account and causing a multiple-service card to be sent to the consumer, wherein said multiple-service card is configured for providing a primary party's services and a service partner's services.

9. The multiple-service card of claim 8, said first indicia including an account number, a name of the holder, and an expiration date.

10. The multiple-service card of claim 8, said second indicia including a service partner information.

11. The multiple-service card of claim 8, said second indicia including a at least one of a magnetic stripe that accesses an account information, signature block, customer service number, a barcode representing a service partner membership number and an image of the card holder.

* * * * *